(12) United States Patent
Yoo et al.

(10) Patent No.: US 10,785,465 B2
(45) Date of Patent: Sep. 22, 2020

(54) HEAD MOUNTED DISPLAY DEVICE

(71) Applicant: SAMSUNG DISPLAY CO., LTD., Yongin-si, Gyeonggi-do (KR)

(72) Inventors: Hyun Seuk Yoo, Yongin-si (KR); Eun Ho Lee, Yongin-si (KR); Hyung Jin Kim, Yongin-si (KR); Hyun Dae Lee, Yongin-si (KR); Woo Seok Han, Yongin-si (KR); Hee Chul Hwang, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 183 days.

(21) Appl. No.: 15/700,546

(22) Filed: Sep. 11, 2017

(65) Prior Publication Data

US 2018/0103245 A1 Apr. 12, 2018

(30) Foreign Application Priority Data

Oct. 7, 2016 (KR) .................. 10-2016-0130022

(51) Int. Cl.
*H04N 13/344* (2018.01)
*H04N 13/133* (2018.01)
*G02B 27/01* (2006.01)
*H04N 13/398* (2018.01)

(52) U.S. Cl.
CPC ......... *H04N 13/133* (2018.05); *G02B 27/017* (2013.01); *H04N 13/344* (2018.05); *H04N 13/398* (2018.05); *G02B 2027/014* (2013.01)

(58) Field of Classification Search
None
See application file for complete search history.

(56) References Cited

U.S. PATENT DOCUMENTS

| | | |
|---|---|---|
| 2011/0012899 A1 | 1/2011 | Inoue et al. |
| 2011/0193886 A1* | 8/2011 | Kim ............... G09G 3/2044 345/690 |
| 2011/0234475 A1 | 9/2011 | Endo |
| 2011/0317935 A1* | 12/2011 | Anan ............... G06K 9/6278 382/274 |
| 2012/0044260 A1 | 2/2012 | Hirai |
| 2013/0028524 A1* | 1/2013 | Kondo ............... G06K 9/38 382/199 |

(Continued)

FOREIGN PATENT DOCUMENTS

| | | |
|---|---|---|
| KR | 1020150048394 A | 5/2015 |
| KR | 1020160084925 A | 7/2016 |

OTHER PUBLICATIONS

Extended European Search Report for Application No. 17195314.4 dated Feb. 9, 2018.

*Primary Examiner* — Eileen M Adams
(74) *Attorney, Agent, or Firm* — Cantor Colburn LLP

(57) ABSTRACT

A head mounted display device includes a display unit divided into at least one first area and at least one second area, a lens unit which supplies an image displayed on the display unit to a user, and a frame which fixes the display unit and the lens unit thereto. The display unit includes a memory which stores first compensation data corresponding to the first area and second compensation data corresponding to the second area, and a position determiner which determines whether first data supplied from an outside belong to the first area or the second area.

20 Claims, 5 Drawing Sheets

(56) References Cited

U.S. PATENT DOCUMENTS

| | | | |
|---|---|---|---|
| 2015/0116387 A1 | 4/2015 | Jun et al. | |
| 2015/0227173 A1* | 8/2015 | Hwang | G06T 11/60 |
| | | | 345/619 |
| 2015/0355465 A1* | 12/2015 | Jones | G02B 27/0172 |
| | | | 359/463 |
| 2016/0054567 A1* | 2/2016 | Kim | G02B 27/0172 |
| | | | 345/8 |
| 2016/0196778 A1 | 7/2016 | Cha | |

* cited by examiner

HEAD MOUNTED DISPLAY DEVICE

The application claims priority to Korean Patent Application No. 10-2016-0130022, filed on Oct. 7, 2016, and all the benefits accruing therefrom under 35 U.S.C. § 119, the content of which in its entirety is herein incorporated by reference.

BACKGROUND

1. Field

Exemplary embodiments of the invention relate to a head mounted display device, and more particularly, to a head mounted display device which minimizes a capacity of a memory.

2. Description of the Related Art

A head mounted display device (hereinafter, referred to as "HMD") is a small-sized image device for displaying an image having a sense of realism. The HMD has been commercialized with a development of display technology. As the HMD provides high-degree immersion, the HMD is used for various usages including movie appreciation.

The HMD is used to be mounted on a user's head, and therefore it is desired for the HMD to be made small in size and light in weight. That is, a method for enabling the HMD to be small in size and light in weight is desired.

SUMMARY

Exemplary embodiments provide a head mount mounted display device ("HMD") which minimizes a capacity of a memory while maintaining image quality.

According to an exemplary embodiment of the invention, there is provided an HMD including a display unit divided into a first area and a second area, and a memory which stores first compensation data corresponding to the first area and second compensation data corresponding to the second area, where a capacity assigned to the first compensation data in the memory is set larger than that assigned to the second compensation data.

In an exemplary embodiment, the HMD may further include a lens unit which supplies an image displayed on the display unit to a user, and a frame which fixes the display unit and the lens unit thereto.

In an exemplary embodiment, the first area may be set as a central area corresponding to each of left and right eyes of a user. The second area may be set as an area except for the first area.

In an exemplary embodiment, the HMD may further include a position determiner which determines whether first data supplied from an outside belong to the first area or the second area.

In an exemplary embodiment, the position determiner may generate third data by adding position information corresponding to the first area or the second area to the first data.

In an exemplary embodiment, the HMD may further include a timing controller which receives the third data, and generates second data by changing bits of the third data using the first compensation data or the second compensation data.

In an exemplary embodiment, the first area may have a shape of a curve.

In an exemplary embodiment, the first area may have a shape of a circle.

In an exemplary embodiment, when the following Inequality 1 is satisfied, the position determiner may determine that the first data belong to the first area:

$$(x-x0)^2 + (y-y0)^2 < c. \qquad \text{Inequality 1}$$

In an exemplary embodiment, in Inequality 1, x0 and y0 denotes a coordinate of a pixel located at a central portion of each of the first panel and the second panel, x and y denote a position coordinate of currently input first data, and c denotes a constant corresponding to a size of the first area.

In an exemplary embodiment, the first area may have a shape of an ellipse.

In an exemplary embodiment, when the following Inequality 2 is satisfied, the position determiner may determine that the first data belong to the first area:

$$(x-x0)^2 + b(y-y0)^2 < c. \qquad \text{Inequality 2}$$

In an exemplary embodiment, in Inequality 2, x0 and y0 denotes the coordinate of a pixel located at the central portion of each of the first panel and the second panel, x and y denote a position coordinate of currently input first data, c denotes a constant corresponding to the size of the first area, and b denotes a constant corresponding to the shape of the ellipse.

In an exemplary embodiment, the first area may have the shape of a polygon.

In an exemplary embodiment, the first area may have the shape of a quadrangle.

In an exemplary embodiment, when the following Inequality 3 is satisfied, the position determiner may determine that the first data belong to the first area:

$$(x0' < x < x1) \text{ and } (y0' < y < y1). \qquad \text{Inequality 3}$$

In an exemplary embodiment, in Inequality 3, x0' denotes a coordinate of an X-axis start point of the first area, x1 denotes the coordinate of an X-axis end point of the first area, y0' denotes a coordinate of a Y-axis start point of the first area, and y1 denotes a coordinate of a Y-axis end point of the first area.

In an exemplary embodiment, each of the first compensation data may be included in the first area, and correspond to a unit of a first block including at least one pixel. Each of the second compensation data may be included in the second area, and correspond to a unit of a second block including at least two pixels.

In an exemplary embodiment, the second block may include a larger number of pixels than the first block.

In an exemplary embodiment, when at least two pixels are included in the first block, the first compensation data may be generated by a representative value of the at least two pixels of the first block.

In an exemplary embodiment, the representative value may be an average value of characteristics of the at least two pixels of the first block.

In an exemplary embodiment, the second compensation data may be generated by a representative value of the at least two pixels included in the second block.

In an exemplary embodiment, the representative value may be an average value of characteristics of the at least two pixels of the second block.

BRIEF DESCRIPTION OF THE DRAWINGS

Exemplary embodiments will now be described more fully hereinafter with reference to the accompanying drawings. However, they may be embodied in different forms and should not be construed as limited to the exemplary embodiments set forth herein. Rather, these exemplary embodiments are provided so that this invention will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
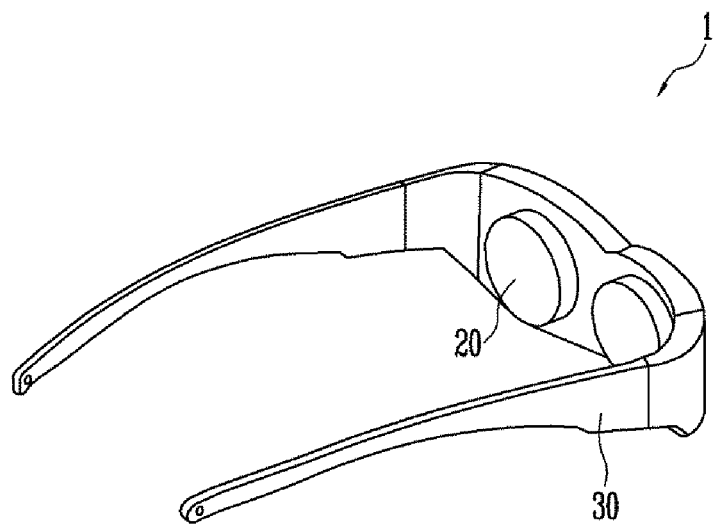
FIG. 1 is a view illustrating an exemplary embodiment of an HMD according to the invention.

In the following detailed description, only certain exemplary embodiments of the disclosure have been shown and described, simply by way of illustration. As those skilled in the art would realize, the described embodiments may be modified in various different ways, all without departing from the spirit or scope of the disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. Further, some of the elements that are not essential to the complete understanding of the disclosure are omitted for clarity. Also, like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
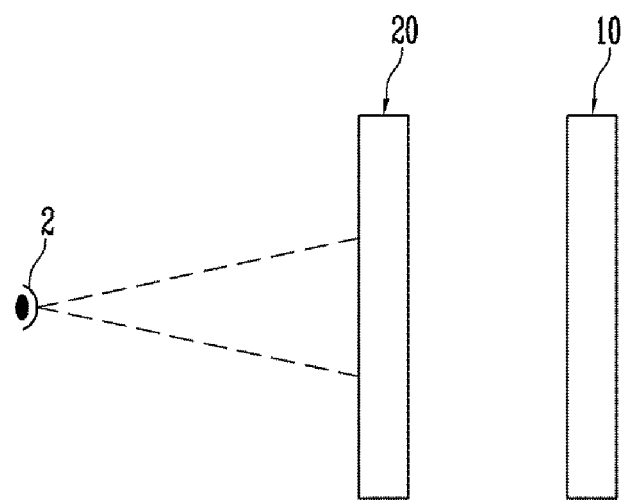
FIG. 2 is a view schematically illustrating a structure of the HMD of FIG. 1.

FIG. 1 is a view illustrating a head mounted display device ("MID") according to an exemplary embodiment of the invention. FIG. 2 is a view schematically illustrating a structure of the HMD of FIG. 1.

Referring to FIGS. 1 and 2, the HMD 1 includes a frame 30 wearable by a user, and a lens unit 20 and a display unit 10, which are disposed (e.g., mounted) to the frame 30.

The user wears the HMD 1 using the frame 30. To this end, the frame 30 is wearable by the user. In FIG. 1, it is illustrated that the frame 30 is provided in the shape of glasses, but the invention is not limited thereto. In an exemplary embodiment, the frame 30 may be provided in various shapes including a helmet, and the like, to be wearable by the user.

The display unit 10 displays a predetermined image corresponding to data input from an external image output device. To this end, the display unit 10 includes at least one display panel. In an exemplary embodiment, the display unit 10 may include a first panel corresponding to a left eye of the user and a second panel corresponding to a left eye of the user, for example. The display unit 10 displays a predetermined image supplied to the left and right eyes.

In an exemplary embodiment, the first and second panels included in the display unit 10 may be implemented with various display devices including a liquid crystal display device and an organic light emitting display device, for example.

The lens unit 20 refracts an image output from the display unit 10 in the direction of the eyes 2 of the user. To this end, the lens unit 20 includes at least one lens (not shown). As the user views the display unit 10 via the lens unit 20, it is possible to obtain an effect as if the user viewed an image on a large-sized screen distant at a certain distance therefrom.

The user receives images of the first panel and the second panel via the lens unit 20, and therefore, each of the first panel and the second panel may be divided into a first area and a second area.

The first area means an area having high visibility. In an exemplary embodiment, the first area of the first panel may be set such that the first panel includes a pixel located at the center of the first panel, for example. Similarly, the first area of the second panel may also be set such that the second panel includes a pixel located at the center of the second panel.

The second area means an area having low visibility. In an exemplary embodiment, an area except for the first area in the first panel may be set as the second area, for example. Similarly, an area except for the first area in the second panel may be set as the second area.

In other words, the first area may be set as a central area corresponding to each of the left and right eyes, and the second area may be set as an area except for the first area.

In the exemplary embodiment of the invention, data is corrected by different methods in the first area and the second area, and accordingly, it is possible to minimize the capacity of a memory while maintaining image quality. This will be described in detail later.

Figure 3:
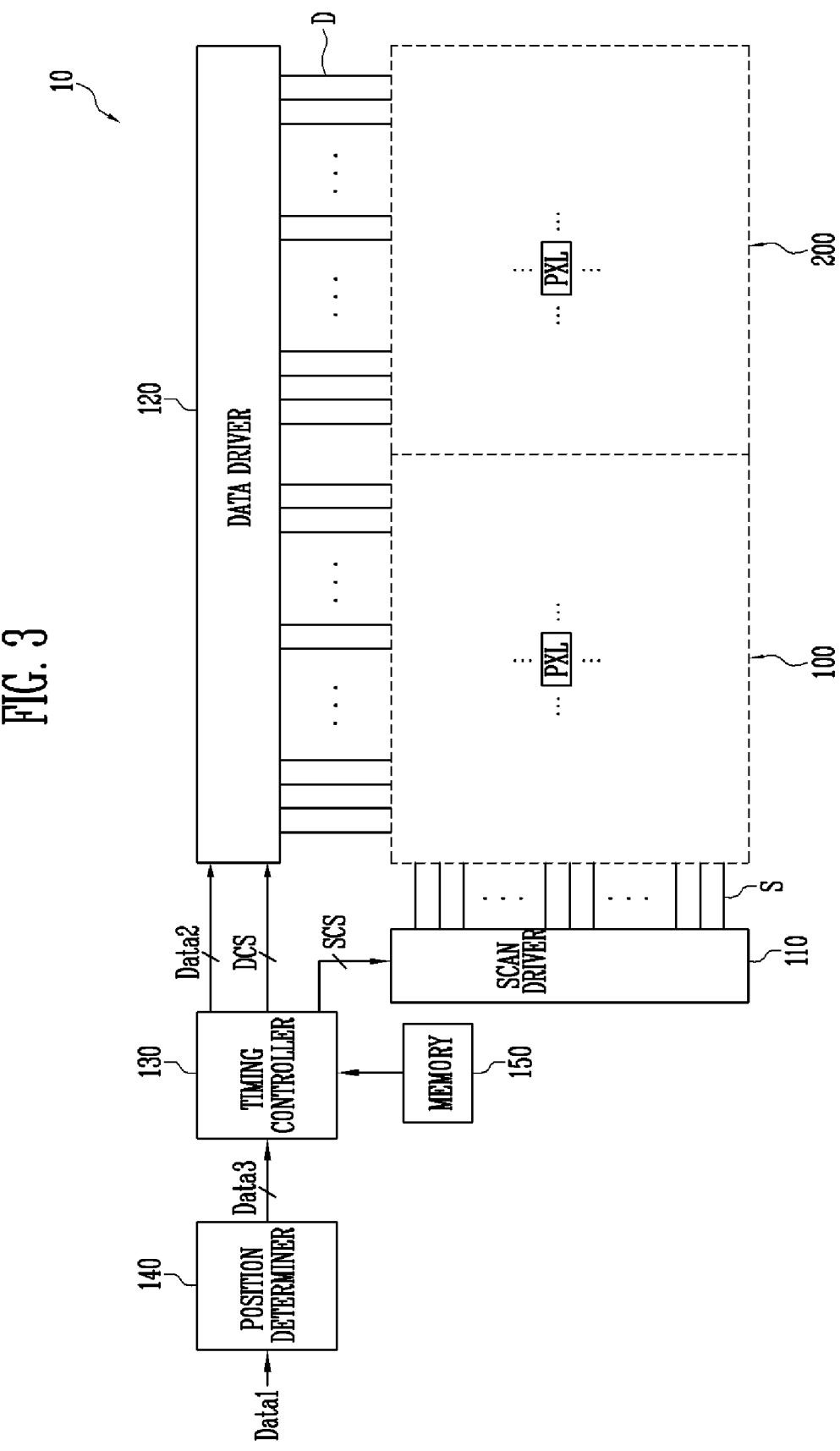
FIGS. 3 and 4 are views illustrating embodiments of a display unit shown in FIG. 2.

FIG. 3 is a view illustrating an exemplary embodiment of the display unit shown in FIG. 2.

Referring to FIG. 3, the display unit 10 according to the exemplary embodiment of the invention includes a first panel 100, a second panel 200, a scan driver 110, a data driver 120, a timing controller 130, a position determiner 140, and a memory 150.

The first panel 100 displays a predetermined image supplied to the left eye of the user. To this end, the first panel 100 includes a plurality of pixels PXL located to be connected to scan lines S and data lines D. Pixels PXL are selected by a scan signal supplied to the scan line S to receive a data signal supplied from the data lines D. The pixels PXL receiving the data signal supply light with a predetermined luminance corresponding to the data signal to the lens unit 20 (refer to FIGS. 1 and 2).

The first panel 100 may be divided into a first area having high visibility and a second area having low visibility. In an exemplary embodiment, the first area may be set as a central area of the first panel 100, and the second area may be set as a peripheral area except for the central area of the first panel 100, for example.

The second panel 200 displays a predetermined image supplied to the right eye of the user. To this end, the second panel 200 includes a plurality of pixels PXL located to be connected to the scan lines S and the data lines D. Pixels PXL are selected by a scan signal supplied to the scan lines S to receive a data signal supplied from the data lines D. The pixels PXL receiving the data signal supply light with a predetermined luminance corresponding to the data signal to the lens unit 20.

The second panel 200 may be divided into a first area having high visibility and a second area having low visibility. In an exemplary embodiment, the first area may be set as a central area of the second panel 200, and the second area may be set as a peripheral area except for the central area of the second panel 200, for example.

The data driver 120 generates a data signal using second data Data2 input from the timing controller 130 and supplies the generated data signal to the data lines D.

The scan driver 110 supplies a scan signal to the scan lines S. In an exemplary embodiment, the scan driver 110 may sequentially supply the scan signal to the scan lines S, for example. When the scan signal is sequentially supplied to the scan lines S, pixels PXL are selected in units of horizontal lines, and the pixels PXL selected by the scan signal are supplied with a data signal.

The memory 150 stores first compensation data and second compensation data. The first compensation data and the second compensation data are stored in advance such that luminances of the first panel 100 and the second panel 200 are equal to each other. Here, the first compensation data are stored corresponding to pixels PXL located in the first area of each of the first panel 100 and the second panel 200, and the second compensation data are stored corresponding to pixels PXL located in the second area of each of the first panel 100 and the second panel 200. The first compensation data and the second compensation data are generated corresponding to a different number of pixels PXL.

In an exemplary embodiment, the first compensation data are generated corresponding to the number of pixels PXL in units of first blocks, corresponding to the first areas of the first panel 100 and the second panel 200, for example. In addition, the second compensation data are generated corresponding to the number of pixels PXL in units of second blocks, corresponding to the second areas of the first panel 100 and the second panel 200. Here, the number of pixels PXL included in a second block is set different from that of pixels PXL included in a first block. In an exemplary embodiment, the second block may include a larger number of pixels PXL than the first block, for example.

In this case, a capacity assigned to the first compensation data in the memory 150 is set larger than that assigned to the second compensation data. That is, the first compensation data generated corresponding to the number of pixels PXL in units of first blocks occupy a larger storage capacity than the second compensation data generated corresponding to the number of pixels PXL in units of second blocks.

The position determiner 140 receives first data Data1 supplied from the outside. The position determiner 140 receiving the first data Data1 determines whether the currently supplied first data Data1 belongs to the first area or the second area. The position determiner 140 determining the position of the first data Data1 generates third data Data3 by adding position information to the first data Data1, and supplies the generated third data Data3 to the timing controller 130.

Here, the position determiner 140 may generate the third data Data3 by adding a bit of "1" or "0" to the first data Data1. In an exemplary embodiment, when it is determined that the currently input first data Data1 belongs to the first area, the position determiner 140 may generate the third data Data3 by adding the bit of "1" to the first data Data1, for example. In an exemplary embodiment, when it is determined that the currently input first data Data1 belongs to the second area, the position determiner 140 may generate the third data Data3 by adding the bit of "0" to the first data Data1, for example.

The timing controller 130 receives the third data Data3 from the position determiner 140. The timing controller 130 receiving the third data Data3 changes bits of the third data Data3 using the first compensation data or the second compensation data, corresponding to the position information of the third data Data3. At this time, the third data Data3 of which bits are changed is supplied as the second data Data2 to the data driver 120.

In an exemplary embodiment, when the third data Data3 is included in the first area, the timing controller 130 may generate the second data Data2 by changing the bits of the third data Data3 using the first compensation data, for example. In an exemplary embodiment, when the third data Data3 is included in the second area, the timing controller 130 may generate the second data Data2 by changing the bits of the third data Data3 using the second compensation data, for example. In an exemplary embodiment, when the second data Data2 is generated, the position information (e.g., the bit of "1" or "0") added by the position determiner 140 may be removed, for example.

The timing controller 130 generates a data control signal DCS and a scan control signal SCS, based on timing signals supplied from the outside. The data control signal DCS generated by the timing controller 130 is supplied to the data driver 120, and the scan control signal SCS generated by the timing controller 130 is supplied to the scan driver 110.

The data control signal DCS includes a source start pulse and clock signals. The source start pulse controls a sampling start time of data. The clock signals are used to control a sampling operation.

The scan control signal SCS includes a start pulse and clock signals. The start pulse controls a timing of a first scan signal or a first light emitting control signal. The clock signals are used to shift the start pulse.

The scan driver 110, the data driver 120, the timing controller 130, the position determiner 140, and/or the memory 150, which are described above, may be disposed in the first panel 100 and the second panel 200 or to be attached to the first panel 100 and the second panel 200. That is, the scan driver 110, the data driver 120, the timing controller 130, the position determiner 140, and/or the memory 150 are functionally separated components, and may be unitary in the first panel 100 and the second panel 200.

In an exemplary embodiment, the position determiner 140 may be located in the timing controller 130. That is, the position determiner 140 determines a position of the first data Data1, and may be located at the inside or outside of the timing controller 130.

Additionally, in FIG. 3, it is illustrated that the first panel 100 and the second panel 200 are driven by the same scan and data drivers 110 and 120, but the invention is not limited.

Figure 4:
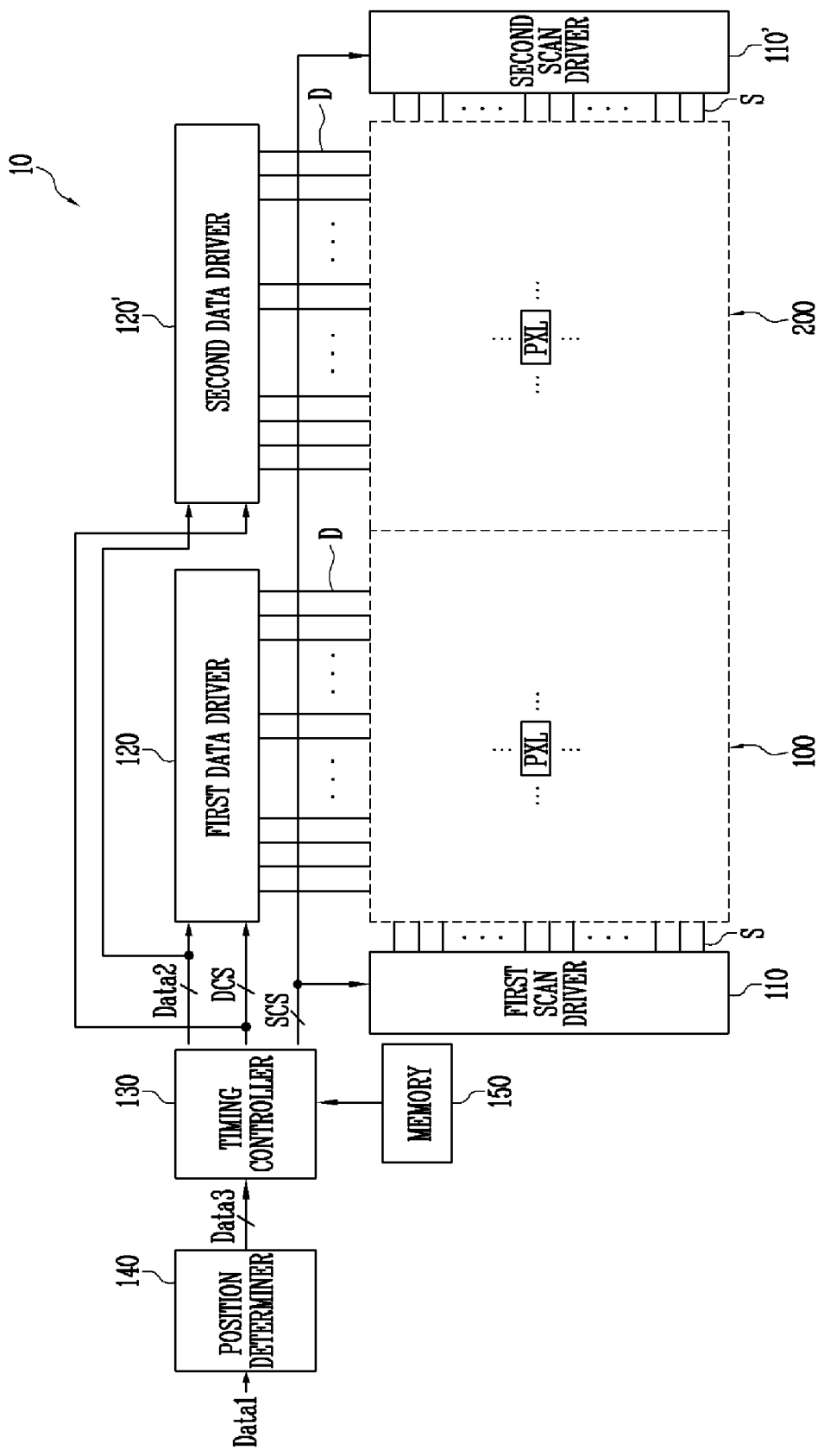

In an exemplary embodiment, as shown in FIG. 4, the first panel 100 may be driven by a first scan driver 110 and a first data driver 120, and the second panel 200 may be driven by a second scan driver 110' and a second data driver 120', for example.

Figure 5:
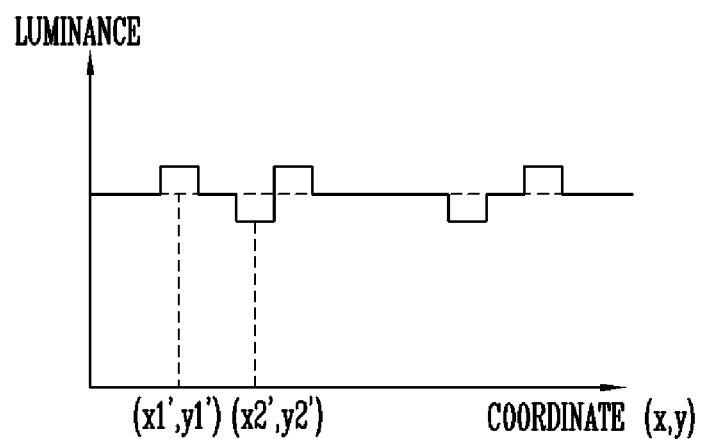
FIG. 5 is a view schematically illustrating a process of storing compensation data in a memory.

FIG. 5 is a view schematically illustrating a process of storing compensation data in the memory.

Referring to FIG. 5, before the display unit 10 is released, the same data signal is supplied to the pixels PXL (refer to FIGS. 3 and 4) included in the first panel 100 and the second panels 200 (refer to FIGS. 3 and 4). After the same data signal is supplied to the pixels PXL, the first panel 100 and the second panel 200 are photographed by a camera (not shown), and differences in luminance between the pixels PXL are extracted by analyzing the photographed image.

In this case, as shown in FIG. 5, a pixel PXL located at a first coordinate (x1', y1') may be set to a higher luminance than a pixel PXL located at a second coordinate (x2', y2'). Compensation data is set to compensate for a difference in luminance between the pixel PXL located at a first coordinate (x1', y1') and the pixel PXL located at a second coordinate (x2', y2').

In an exemplary embodiment, compensation data set to correspond to the first coordinate (x1', y1') may be set such that a luminance of the first data Data1 corresponding to the first coordinate (x1', y1') is decreased. In addition, compensation data set to correspond to the second coordinate (x2', y2') may be set such that a luminance of the first data Data1 corresponding to the second coordinate (x2', y2') is increased, for example. Then, uniform luminance can be implemented in the pixels PXL located at the first coordinate (x1', y1') and the second coordinate (x2', y2'), corresponding to the same data signal.

However, when compensation data is set corresponding to each of the pixels PXL, the capacity of the memory 150 (refer to FIGS. 3 and 4) is increased. The increase in the capacity of the memory 150 makes it difficult to allow the HMD to be small in size and light in weight. Accordingly, a method for reducing the capacity of the memory 150 while maintaining image quality is proposed in the exemplary embodiment of the invention.

Additionally, a method for storing compensation data in the memory 150 using the camera has been described in FIG. 5, but the invention is not limited thereto. That is, the exemplary embodiment of the invention may include various methods currently known in the art as long as compensation data can be stored in the memory 150.

Figure 6:
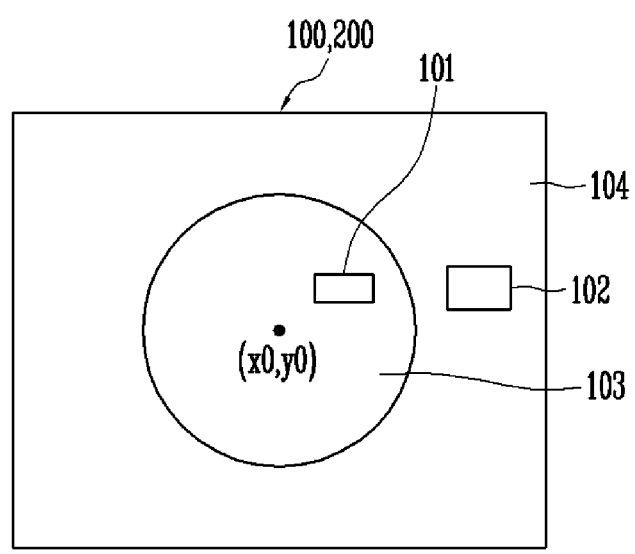
FIG. 6 is a view illustrating an exemplary embodiment of a first area and a second area according to the invention.

FIG. 6 is a view illustrating a first area and a second area according to an exemplary embodiment of the invention.

Referring to FIG. 6, each of the first panel 100 and the second panel 200 according to the exemplary embodiment of the invention is divided into a first area 103 and a second area 104. Here, the first area 103 may be defined to include a pixel PXL (refer to FIGS. 3 and 4) located at a central portion of each of the first panel 100 and the second panel 200 (refer to FIGS. 3 and 4). In FIG. 6, it is assumed that the coordinate of the pixel PXL located at the central portion of each of the first panel 100 and the second panel 200 is "(x0, y0)."

The first area 103 may have the shape of a curve. In an exemplary embodiment, the first area 103 may be set to the shape of a circle, for example. In addition, the second area 104 may be defined as an area except for the first area 103 in each of the first panel 100 and the second panel 200.

The first area 103 has high visibility as a central area of each of the first panel 100 and the second panel 200. Therefore, first compensation data is generated corresponding to pixels PXL in the unit of a first block 101 such that any stain of the first area 103 is not recognized by the user. In an exemplary embodiment, when k (k is a natural number) first blocks 101 are included in the first area 103, k first compensation data may be stored in the memory 150 (refer to FIGS. 3 and 4), for example.

The first block 101 may include only one pixel PXL. Then, the first compensation data is stored in the memory 150, corresponding to each pixel PXL, and accordingly, a uniform image can be displayed in the first area.

In addition, two or more pixels PXL may be included in the first block 101. In this case, the first compensation data may be generated corresponding to a representative value of the first block 101. In an exemplary embodiment, the representative value of the first block 101 may be set to an average value of characteristics of the pixels PXL included in the first block 101, for example.

The second area 104 has low visibility as a peripheral area of each of the first panel 100 and the second panel 200. Therefore, any stain of the second area 104 is not well recognized by the user. Accordingly, second compensation data is generated corresponding to pixels PXL in the unit of a second block 102. Here, the second block 102 is set to include at least two pixels PXL.

In this case, the second compensation data may be generated corresponding to a representative value of the second block 102. In an exemplary embodiment, the representative value of the second block 102 may be set to an average value of characteristics of the pixels PXL included in the second block 102, for example.

Additionally, the second block 102 is set to include a larger number of pixels PXL than the first block 101. When a larger number of pixels PXL are included in the second block 102, an area of the memory 150, which corresponds to the second compensation data, can be minimized. In addition, since the second area 104 is an area having low visibility, a stain or the like is not well recognized by the user even when the second data Data2 is generated by the second compensation data. That is, in the exemplary embodiment of the invention, the second compensation data is generated in the unit of the second block 102, and accordingly, it is possible to minimize the capacity of the memory 150 while maintaining image quality.

When the first area 103 has the shape of a circle as shown in FIG. 6, the position determiner 140 may determine whether the first data Data1 is located in the first area 103 and the second area 104, using Inequality 1, for example.

$$(x-x0)^2+(y-y0)^2<c \qquad \text{Inequality 1}$$

In Inequality 1, x0 and y0 denote the coordinate of the pixel PXL located at the central portion of each of the first panel 100 and the second panel 200. Also, x and y denote the position coordinate of currently input first data Data1. Also, c denotes a size of the first area 103, i.e., a constant value arbitrarily set corresponding to the size of the circle.

When the currently input first data Data1 satisfies Inequality 1, the position determiner 140 determines that the first data Data1 is located in the first area 103, and otherwise, determines that the first data Data1 is located in the second area 104.

The first area 103 is an area having high visibility, and may be set to various shapes. In an exemplary embodiment, the first area 103 may be set by the shape of the lens included in the lens unit 20 (refer to FIGS. 1 and 2), for example.

Figure 7:
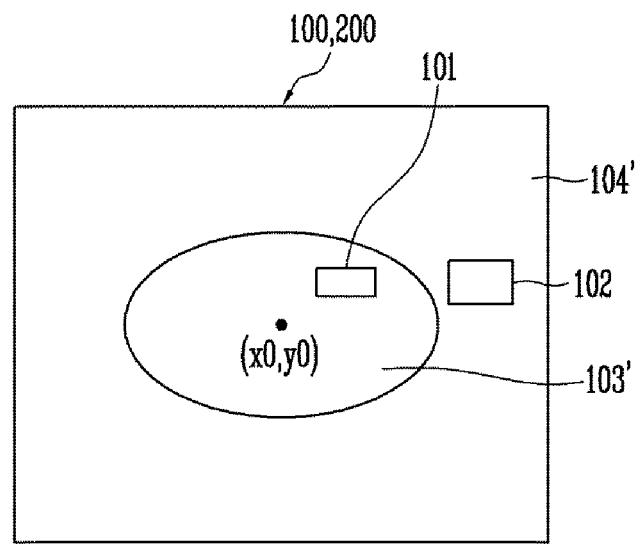
FIG. 7 is a view illustrating another embodiment of a first area and a second area according to the invention.

FIG. 7 is a view illustrating a first area and a second area according to another embodiment of the invention. In FIG. 7, components functionally identical to those of FIG. 6 are designated by like reference numerals.

Referring to FIG. 7, each of the first panel 100 and the second panel 200 according to the exemplary embodiment of the invention is divided into a first area 103' and a second area 104'.

Here, the first area 103' may be defined to include a pixel PXL (coordinate: x0, y0) located at a central portion of each of the first panel 100 and the second panel 200 (refer to FIGS. 3 and 4). The first area 103' may have the shape of a curve. In an exemplary embodiment, the first area 103' may be set to the shape of an ellipse, for example. In addition, the second area 104' may be defined as an area except for the first area 103' in each of the first panel 100 and the second panel 200.

The first area 103' has high visibility as a central area of each of the first panel 100 and the second panel 200. Therefore, first compensation data is generated corresponding to pixels PXL in the unit of a first block 101 such that any stain of the first area 103' is not recognized by the user. Here, the first block 101 is set to include one or more pixels PXL.

The second area 104' has low visibility as a peripheral area of each of the first panel 100 and the second panel 200. Therefore, any stain of the second area 104' is not well recognized by the user. Accordingly, second compensation data is generated corresponding to pixels PXL in the unit of a second block 102. Here, the second block 102 is set to include at least two pixels PXL.

In an exemplary embodiment, the second block 102 is set to include a larger number of pixels PXL than the first block 101, for example. When a larger number of pixels PXL are included in the second block 102 as described above, an area of the memory 150, (refer to FIGS. 3 and 4) which corresponds to the second compensation data, can be minimized. In addition, since the second area 104' is an area having low visibility, a stain or the like is not well recognized by the user even when the second data Data2 is generated by the second compensation data.

When the first area 103' has the shape of an ellipse as shown in FIG. 7, the position determiner 140 may determine whether the first data Data1 is located in the first area 103' or the second area 104', using Inequality 2.

$$(x-x0)^2+b(y-y0)^2<c \qquad \text{Inequality 2}$$

In Inequality 2, x0 and y0 denote the coordinate of the pixel PXL located at the central portion of each of the first panel 100 and the second panel 200. Also, x and y denote the position coordinate of currently input first data Data1. Also, c denotes a size of the first area 103', i.e., a constant value arbitrarily set corresponding to the size of the ellipse. Also, b denotes a constant value arbitrarily set corresponding to the shape of the ellipse.

When the currently input first data Data1 satisfies Inequality 2, the position determiner 140 determines that the first data Data1 is located in the first area 103', and otherwise, determines that the first data Data1 is located in the second area 104'.

Figure 8:
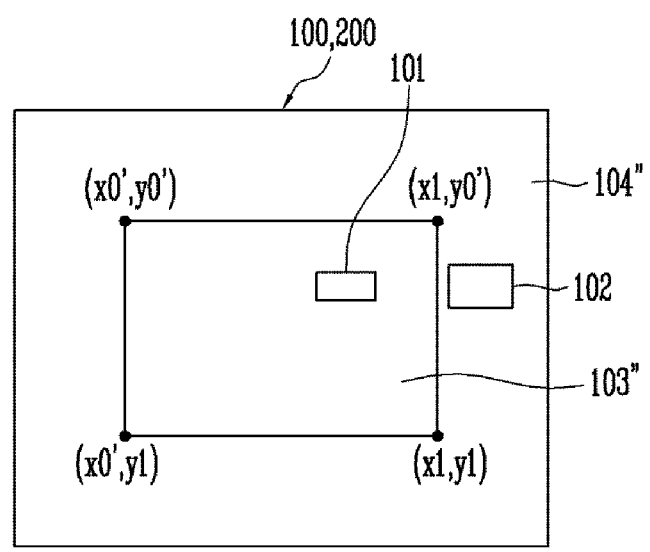
FIG. 8 is a view illustrating still another embodiment of a first area and a second area according to the invention.

FIG. 8 is a view illustrating a first area and a second area according to still another embodiment of the invention. In FIG. 8, components functionally identical to those of FIG. 6 are designated by like reference numerals.

Referring to FIG. 8, each of the first panel 100 and the second panel 200 according to the exemplary embodiment of the invention is divided into a first area 103" and a second area 104".

Here, the first area 103" may be defined to include a pixel PXL (refer to FIGS. 3 and 4) located at a central portion of each of the first panel 100 and the second panel 200 (refer to FIGS. 3 and 4). In an exemplary embodiment, the first area 103" may have the shape of a polygon, for example. In an exemplary embodiment, the first area 103" may be set to the shape of a quadrangle, for example. In addition, the second area 104" may be defined as an area except for the first area 103" in each of the first panel 100 and the second panel 200.

The first area 103" has high visibility as a central area of each of the first panel 100 and the second panel 200. Therefore, first compensation data is generated corresponding to pixels PXL in the unit of a first block 101 such that any stain of the first area 103" is not recognized by the user. Here, the first block 101 is set to include one or more pixels PXL.

The second area 104" has low visibility as a peripheral area of each of the first panel 100 and the second panel 200. Therefore, any stain of the second area 104" is not well recognized by the user. Accordingly, the second compensation data is generated corresponding to pixels PXL in the unit of a second block 102. Here, the second block 102 is set to include at least two pixels PXL.

In an exemplary embodiment, the second block 102 is set to include a larger number of pixels PXL than the first block 101, for example. When a larger number of pixels PXL are included in the second block 102 as described above, an area of the memory 150, which corresponds to the second compensation data, can be minimized. In addition, since the second area 104" is an area having low visibility, a stain or the like is not well recognized by the user even when the second data Data2 is generated by the second compensation data.

When the first area 103" has the shape of a quadrangle as shown in FIG. 8, the position determiner 140 may determine whether the first data Data1 is located in the first area 103" or the second area 104", using Inequality 3.

$$(x0' \le x \le x1) \text{ and } (y0' \le y \le y1) \quad \text{Inequality 3}$$

In Inequality 3, x0' denotes the coordinate of an X-axis start point of the first area 103", x1 denotes the coordinate of an X-axis end point of the first area 103", y0' denotes the coordinate of a Y-axis start point of the first area 103", and y1 denotes the coordinate of a Y-axis end point of the first area 103".

When currently input first data Data1 satisfies Inequality 3, the position determiner 140 determines that the first data Data1 is located in the first area 103", and otherwise, determines that the first data Data1 is located in the second area 104".

In the above, it has been described that the second compensation data is stored corresponding to the second area 104, 104', or 104", but the invention is not limited thereto. In an exemplary embodiment, the second compensation data may not be stored corresponding to the second area 104, 104', or 104", for example. When the second compensation data may not be stored corresponding to the second area 104, 104', or 104" as described above, the capacity of the memory 150 (refer to FIGS. 3 and 4) can be minimized.

Additionally, when the second compensation data may not be stored corresponding to the second area 104, 104', or 104", the timing controller 130 may supply, to the data driver 120, second data Data2 generated by removing position information (e.g., the bit of "1" or "0") when third data Data3 corresponding to the second area 104, 104', or 104" is supplied.

According to the invention, the HMD corrects image quality using first compensation data in a central area and corrects image quality using second compensation data in a peripheral area. Here, the first compensation data is generated corresponding to a first block including at least one pixel, and the second compensation data is generated corresponding to a second block including at least two pixels.

That is, according to the invention, the image quality is corrected using the first compensation data corresponding to pixels in the unit of first block in the central area having high visibility, and the image quality is corrected using the second compensation data corresponding to pixels in the unit of the second block in the peripheral area having low visibility. Then, the capacity of the memory can be minimized without lowering of the image quality recognized by a user. Accordingly, the HMD can be small in size and light in weight.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other exemplary embodiments unless otherwise specifically indicated. Accordingly, it will be understood by those of skill in the art that various changes in form and details may be made without departing from the spirit and scope of the disclosure as set forth in the following claims.

What is claimed is:

1. A head mounted display device comprising:
   a display unit divided into a first area having a high visibility to a user wearing the head mounted display device and a second area having a low visibility to the user wearing the head mounted display device; and
   a memory which stores first compensation data corresponding to the first area of the display unit and second compensation data corresponding to the second area of the display unit,
   wherein the first compensation data only requires larger storage than the second compensation data,
   wherein each of the first compensation data corresponds to a unit of a first block and each of the second compensation data corresponds to a unit of a second block, and
   wherein the number of pixels included in the second block is set different from that of pixels included in the first block.

2. The head mounted display of claim 1, further comprising:
   a lens unit which supplies an image displayed on the display unit to a user; and
   a frame which fixes the display unit and the lens unit thereto.

3. The head mounted display of claim 1, wherein the first area is set as a central area corresponding to each of left and right eyes of a user, and
   wherein the second area is set as an area except for the first area.

4. The head mounted display of claim 1, further comprising a position determiner which determines whether first data supplied from an outside belong to the first area or the second area.

5. The head mounted display of claim 4, wherein the position determiner generates third data by adding position information corresponding to the first area or the second area to the first data.

6. The head mounted display of claim 5, further comprising a timing controller for receiving the third data, and generating second data by changing bits of the third data using the first compensation data or the second compensation data.

7. The head mounted display of claim 5, wherein the first area has a shape of a curve.

8. The head mounted display of claim 7, wherein the first area has a shape of a circle.

9. The head mounted display of claim 8, wherein, when following Inequality 1 is satisfied, the position determiner determines that the first data belong to the first area:

$$(x-x0)^2 + (y-y0)^2 < c, \qquad \text{Inequality 1}$$

wherein, in Inequality 1, x0 and y0 denote a coordinate of a pixel located at a central portion of each of first panel and second panel, x and y denote a position coordinate of currently input first data, and c denotes a constant corresponding to a size of the first area.

10. The head mounted display of claim 7, wherein the first area has a shape of an ellipse.

11. The head mounted display of claim 7, wherein, when following Inequality 2 is satisfied, the position determiner determines that the first data belong to the first area:

$$(x-x0)^2 + b(y-y0)^2 < c, \qquad \text{Inequality 2}$$

wherein, in Inequality 2, x0 and y0 denote a coordinate of a pixel located at the central portion of each of first panel and second panel, x and y denote a position coordinate of currently input first data, c denotes a constant corresponding to a size of the first area, and b denotes a constant corresponding to the shape of the ellipse.

12. The head mounted display of claim 5, wherein the first area has a shape of a polygon.

13. The head mounted display of claim 12, wherein the first area has a shape of a quadrangle.

14. The head mounted display of claim 13, wherein, when following Inequality 3 is satisfied, the position determiner determines that the first data belong to the first area:

$$(x0' \le x \le x1) \text{ and } (y0' \le y \le y1), \qquad \text{Inequality 3}$$

wherein, in Inequality 3, x0' denotes a coordinate of an X-axis start point of the first area, x1 denotes a coordinate of an X-axis end point of the first area, y0' denotes a coordinate of a Y-axis start point of the first area, and y1 denotes a coordinate of a Y-axis end point of the first area.

15. The head mounted display of claim 1, wherein each of the first compensation data is included in the first area, and corresponds to the unit of the first block including at least one pixel, and wherein each of the second compensation data is included in the second area, and corresponds to the unit of the second block including at least two pixels.

16. The head mounted display of claim 15, wherein the second block includes a larger number of pixels than the first block.

17. The head mounted display of claim 15, wherein, when at least two pixels are included in the first block, the first compensation data is generated by a representative value of the at least two pixels of the first block.

18. The head mounted display of claim 17, wherein the representative value is an average value of characteristics of the at least two pixels of the first block.

19. The head mounted display of claim 15, wherein the second compensation data is generated by a representative value of the at least two pixels included in the second block.

20. The head mounted display of claim 19, wherein the representative value is an average value of characteristics of the at least two pixels of the second block.

* * * * *